(12) United States Patent
Prateek et al.

(10) Patent No.: US 11,843,517 B1
(45) Date of Patent: Dec. 12, 2023

(54) SATELLITE VIRTUAL PRIVATE CLOUD NETWORK ENVIRONMENTS

(71) Applicant: Amazon Technologies, Inc., Seattle, WA (US)

(72) Inventors: Anuj Prateek, Coquitlam (CA); Eric Wei, Seattle, WA (US); Pooja Madan, Seattle, WA (US); Juan-Pierre Longmore, Seattle, WA (US); Christopher S. Vasquez, Springfield, VA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 103 days.

(21) Appl. No.: 17/486,051

(22) Filed: Sep. 27, 2021

(51) Int. Cl.
| | |
|---|---|
| *H04L 41/18* | (2022.01) |
| *H04L 9/40* | (2022.01) |
| *H04L 12/46* | (2006.01) |
| *H04L 67/1061* | (2022.01) |
| *H04L 61/4511* | (2022.01) |
| *H04L 101/695* | (2022.01) |

(52) U.S. Cl.
CPC .......... *H04L 41/18* (2013.01); *H04L 12/4641* (2013.01); *H04L 61/4511* (2022.05); *H04L 63/0272* (2013.01); *H04L 67/1061* (2013.01); *H04L 2101/695* (2022.05)

(58) Field of Classification Search
CPC ........... H04L 12/4641; H04L 2101/695; H04L 41/18; H04L 61/4511; H04L 63/0272; H04L 67/1061

USPC ......................................................... 709/223
See application file for complete search history.

(56) References Cited

U.S. PATENT DOCUMENTS

| | | | |
|---|---|---|---|
| 10,511,545 B2* | 12/2019 | Patil | H04L 41/064 |
| 10,992,670 B1* | 4/2021 | Drooger | H04L 63/0428 |
| 11,388,227 B1* | 7/2022 | Sun | H04L 12/4641 |
| 2018/0007002 A1* | 1/2018 | Landgraf | H04L 12/66 |
| 2018/0198851 A1* | 7/2018 | Barabash | H04L 67/1001 |
| 2018/0359143 A1* | 12/2018 | Chattopadhyay | H04L 67/34 |
| 2019/0238509 A1* | 8/2019 | Hira | G06F 9/45558 |
| 2020/0050448 A1* | 2/2020 | Gupta | G06F 16/2455 |
| 2020/0404059 A1* | 12/2020 | Feiguine | H04L 67/51 |
| 2021/0111946 A1* | 4/2021 | Wang | H04L 47/781 |
| 2021/0392114 A1* | 12/2021 | Gernhardt | H04L 63/123 |
| 2022/0052878 A1* | 2/2022 | Kasso | H04L 49/70 |

* cited by examiner

*Primary Examiner* — David P Zarka
(74) *Attorney, Agent, or Firm* — Thomas Horstemeyer, LLP

(57) ABSTRACT

Satellite virtual private clouds (VPCs) are described. A primary VPC is executed having one or more core services hosted therein that are required by one or more satellite VPCs. A satellite VPC is executed that is logically independent of the primary VPC networked environment. A peered connection between the primary VPC and the satellite VPC is established. The peered connection permits the satellite VPC networked environment to access the at least one core service hosted in the primary VPC. A customer account may be associated with a suitable permission to perform isolated development in the satellite VPC networked environment without impacting any service hosted by the primary VPC networked environment.

20 Claims, 5 Drawing Sheets

US 11,843,517 B1

SATELLITE VIRTUAL PRIVATE CLOUD NETWORK ENVIRONMENTS

BACKGROUND

Network service providers offer various types of network services that can be purchased or otherwise used by developers, enterprises, and individuals. Some network services, for example, include virtual private clouds (VPCs) which, in essence, are virtualizations of a data center. Instead of an enterprise purchasing and maintaining its own networking hardware and software in a data center, a network service provider may offer a virtual private cloud as a software-as-a-service (SaaS) that permits enterprises to launch resources in a logically isolated virtual network that is customizable by the enterprises. To this end, enterprises have control over their virtual networking environment, including selecting their own internet protocol (IP) address ranges, creating their own subnets, configuring route tables and network gateways, etc. without having to purchase and maintain costly computing resources in a data center.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
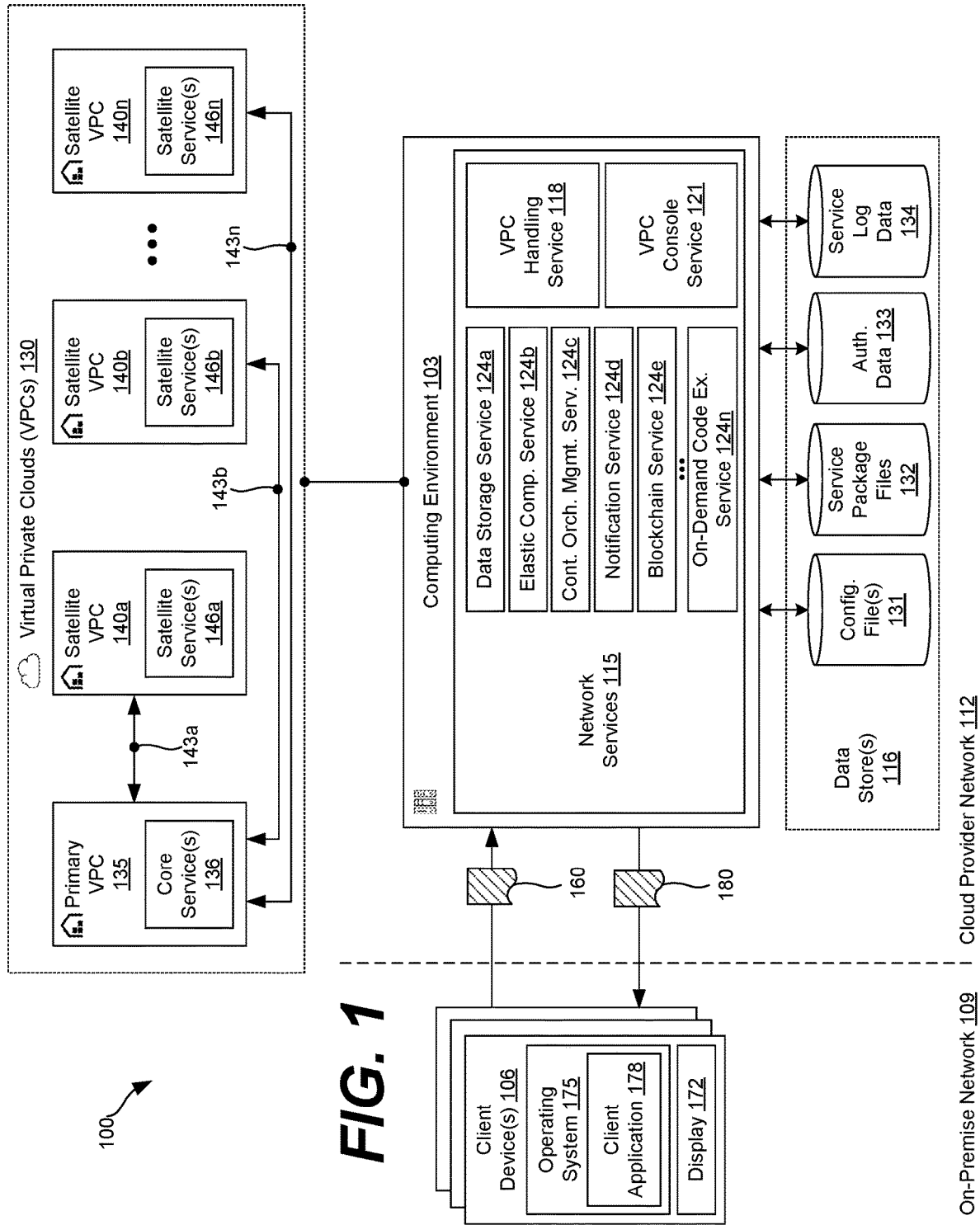
FIG. 1 is a drawing of a networked environment having various virtual private clouds executing in an emulated region according to various embodiments of the present disclosure.

The present disclosure relates to satellite virtual private clouds and associated concepts. More specifically, satellite virtual private clouds are described that allow network service providers and/or customers thereof to build, test, and automate new region and data center launches utilizing satellite VPCs peered with a master VPC, which is also referred to herein as a primary VPC. To this end, the satellite VPCs allow developers to perform isolated development on a new region build and/or data center launch without impacting other services operating in a region.

New data centers and other enterprise-related infrastructure, such as fulfillment centers or regional computing centers, are often opened or brought online to account for increasing consumer demand in various geographical regions, which is often referred to as a region build. However, when a new data center or other facility is opened, various network and computing services must be provided to integrate the data center, fulfillment center, or other facility in existing network and computing infrastructure.

According to various embodiments, a primary VPC is provided having core services and/or other resources that may be utilized by secondary or "satellite" VPCs, where the satellite VPCs are development, testing, and/or production environments for new region builds and/or new data centers. In some embodiments, the satellite VPC is a VPC owned or managed by a customer using predefined infrastructure, which is peered with a primary VPC to utilize resources of the primary VPC, allowing customers to host a partial set of services in its satellite VPC and use other resources from the primary VPC. As such, once a satellite VPC is created, a host management and life cycle may be managed by customers through various tooling provided to do the same.

Based on the foregoing, a network service provider may position itself as a platform provider and a host of a stable test region. Customers of the network service provider can test and iterate their services in a satellite VPC without impacting other services. Additionally, embodiments described herein permit execution of multiple versions of a same service in same region. Customers are also free to choose a recycle cadence of their services in a satellite VPC, independent of a recycle of a primary VPC, allowing customers to test and automate their service setups.

As discussed herein, the term "virtual private cloud" (also referred to as a "virtual private cloud network environment" and "VPC" for short) generally refers to a virtualized network environment in which a collection of computing devices is enabled by a substrate network to communicate, for example, as if the collection of computing devices existed within a local area network (LAN). Accordingly, the devices within a VPC may often share a common subnet and, from the perspective of the devices, directly communicate with one another without the use of complex routing protocols. However, unlike traditional LANs, the devices within a VPC need not share a direct physical interconnection. Instead, the devices may be located in geographically diverse regions and, in some instances, may themselves be virtual devices (e.g., virtual machines).

A substrate (e.g., physical) network may encapsulate or otherwise alter communications from devices associated with the VPC to create the illusion, from the point of view of devices within the VPC, that a LAN environment exists. VPCs provide many advantages over traditional LANs, in that the configuration of computing devices can be changed dynamically, via software, without changing the physical configuration of devices. Moreover, VPCs maintain many benefits of traditional LANs in that communications between the computing devices are relatively simple and secure. However, like traditional LANs, communications into a VPC from an external source (e.g., a publicly addressed server) generally requires the VPC to be at least in part publicly addressable, and to have a computing device open to communications from a public space.

In the following discussion, a general description of a system for providing satellite VPCs to be peered with a primary VPC and its components is provided, followed by a discussion of the operation of the same.

With reference to FIG. 1, shown is a networked environment 100 according to various embodiments. The networked environment 100 includes a computing environment 103 and a client device 106, which are in data communication with each other via a network. The network includes, for example, the Internet, intranets, extranets, wide area networks (WANs), local area networks, wired networks, wireless networks, or other suitable networks, etc., or any combination of two or more such networks. For example, such networks may comprise satellite networks, cable networks, Ethernet networks, and other types of networks.

The computing environment 103 may include, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

In instances in which computing devices of the computing environment 103 are distributed in different geographical regions or locations, the computing devices may make up regional infrastructure or regional computing stacks. For instance, one or more computing devices or other computing infrastructure may form one or more regional computing stacks. Each of the regional computing stacks may serve a physical region, such as a country or portion of a country, to account for demand of computing services, and/or provide consumers with various goods, etc. As such, the regional computing stacks may include those physically located in a facility, where the facility may include a data center, fulfillment center, or other installation as may be appreciated.

The regional infrastructure may be formed as a number of regions, where a region is a geographical area in which a computing provider clusters data centers or other infrastructure. Each region may include two or more availability zones connected to one another via a private high speed network such as, for example, a fiber communication connection. An availability zone refers to an isolated failure domain including one or more data center facilities with separate power, separate networking, and separate cooling from those in another availability zone. Availability zones within a region may be positioned far enough away from one other that the same natural disaster should not take more than one availability zone offline at the same time. Customers may connect to availability zones of the computing provider network via a publicly accessible network (e.g., the Internet or a cellular communication network). Transit Centers (TC) are the primary backbone locations linking customers to the cloud provider network, and may be co-located at other network provider facilities (e.g., Internet service providers or telecommunications providers). Each region can operate two TCs for redundancy.

In one example, a first region may provide electronic commerce-related web services that serve consumers in Australia, whereas a second region provides database storage web services for the Western portion of the United States. In another example, even though the regional computing stacks are distributed geographically, they may work in conjunction to provide a web service accessible from any region. As may be appreciated, each regional computing stack may include physical computing infrastructure, such as such as servers, memory devices, switches, routers, CPUs, GPUs, substrate networks, and other physical computing and network equipment. Additionally, each regional computing stack may operate software and virtual resources on the physical infrastructure to provide various computing services, as will be described.

Various applications and/or other functionality may be executed in the computing environment 103 according to various embodiments. Also, various data is stored in a data store 116 that is accessible to the computing environment 103. The data store 116 may be representative of a plurality of data stores 116 as can be appreciated. The data stored in the data store 116, for example, is associated with the operation of the various applications and/or functional entities described below.

The components executed on the computing environment 103, for example, include network services 115 offered by a network service provider, and other applications, services, processes, systems, engines, or functionality not discussed in detail herein. The network services 115 may include web services in some examples that can be invoked using a network service call or an application programming interface (API) call made to an API. The network services 115 may be independent of the computing environment 103 in some examples, and may be operated by a third-party. As shown in FIG. 1, the network services 115 may be a portion of the computing environment 103, and may be maintained and/or operated by a common entity, such as a network service provider. In some embodiments, the regional computing stacks include regional infrastructure for serving up the network services 115.

In accordance with various embodiments, the network services 115 may include a VPC handling service 118 and a VPC console service 121. In some embodiments, the network services 115 may further include, for example, a data storage service 124a, an elastic computing service 124b, a container orchestration and management service 124c, a notification service 124d, a blockchain service 124e, an on-demand code execution service 124n (also referred to as a serverless compute service), as well as other types of network services 115 as can be appreciated.

The data storage service 124a, for example, may be an elastic block store service (also referred to as a network-based data storage service, a cloud disk service, managed disk service, storage area network service, persistent disk service, or block volumes, in various implementations) that supports customer volumes. In general, a volume can correspond to a logical collection of data, such as a set of data maintained on behalf of a user in the data store 116. The data of the volume may be erasure coded and/or replicated between multiple devices within the computing environment 103 or other distributed computing system in order to provide multiple replicas of the volume (where such replicas may collectively represent the volume on the computing system).

Replicas of a volume in a distributed computing system may beneficially provide for automatic failover and recovery, for example, by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary replica (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Data may be accessed from the data storage service 124*a* using one or more API calls received form the client device 106 or from other services, and typically can be used to transfer data having large file sizes.

The elastic computing service 124*b* may offer virtual compute instances with varying computational and/or memory resources, which are managed by the elastic computing service 124*b*, that may also be referred to in various implementations as a compute virtualization service, a virtual machines service, a computing cloud service, a compute engine, or a cloud compute service. In one embodiment, each of the compute instances, or instances for short, may correspond to one of several instance types or families. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Instances may be executed in the VPCs 130, for example, to deploy various services described herein, such as the core services 136 and satellite services 146.

Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

It may be appreciated that such compute instances may also be able to run in other environments, for example, on the premises of customers (e.g., in an on-premise network 109), where such on-premise instances may be managed by the cloud provider or a third party. In some scenarios, the compute instances may be lightweight micro-virtual machines (microVMs). A cloud provider network 112, on the other hand, may offer other compute resources in addition to compute instances and microVMs, for example containers (which may run in VPCs 130 or bare metal) and/or bare metal servers that are managed by a portion of a cloud provider service running on an offload card of the bare metal server.

In some embodiments, the execution of compute instances by the elastic computing service 124*b* may be supported by a lightweight virtual machine manager (VMM). The VMMs enable the launch of lightweight microVMs in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example, by being run as isolated processes by the VMM. A microVM, as used herein, refers to a VM initialized with a limited device model and/or with a minimal OS kernel that is supported by the lightweight VMM, and which can have a low memory overhead of less than 5 MiB per microVM, for example, such that thousands of microVMs can be packed onto a single host.

For example, a microVM can have a stripped-down version of an operating system (OS) kernel (e.g., having only the required OS components and their dependencies) to minimize boot time and memory footprint. In some implementations, each process of the lightweight VMM encapsulates one and only one microVM. The process can run at least one of the following threads: API, VMM, and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core). A microVM can be used in some implementations to run a containerized workload.

The container orchestration and management service 124*c* may enable customers to run containerized workloads, for example, on their own instances or on managed instances through a serverless container service. A container represents a logical packaging of a software application that abstracts the application from the computing environment 103 in which the application is executed. For example, a containerized version of a software application includes the software code and any dependencies used by the code such that the application can be executed consistently on any infrastructure hosting a suitable container engine (e.g., the Docker® or Kubernetes® container engine).

A container image may be a standalone, executable package of software that includes everything needed to run an application process, such as code, runtime, system tools, system libraries, and settings. Container images become containers at runtime. Containers are thus an abstraction of the application layer (meaning that each container simulates a different software application process). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, other configurations) used to enable the application to run in a container engine.

The on-demand code execution service 124*n* may offer "on-demand" execution of serverless functions (collectively "code functions") without requiring a customer to provision and maintain a server or computing resources that require 24/7 uptime and a continuous subscription. As such, the on-demand code execution service 124*n* may also be referred to as a "serverless" compute service, function compute service, functions service, cloud functions service, or functions-as-a-service in various implementations. To this end, a cloud provider may charge a customer for only the computing resources required to execute a serverless function, which may include seconds, minutes, or hours of computing time instead of requiring a monthly subscription to provide constant uptime. Each of the serverless functions may include a script, code, or an application that is executed when a network-based API is invoked.

To execute a serverless function, the on-demand code execution service 124n may spawn a virtual process in the computing environment 103 (e.g., a server, for example) hosted or maintained by a cloud provider that executes the code and returns a result, such as an output of a function or a build artifact (e.g., compiled code or object code). Metrics associated with the execution of the function are collected, such as CPU usage, processing time, or other metrics, which is then used to charge a customer for the computing resources required to execute the serverless function.

The VPC handling service 118 may include a network service that generates VPCs 130 on behalf of customers or other end users. For instance, an enterprise may wish to have a virtual private cloud that maintains computing services useful for the enterprise to conduct business without the enterprise having to front the expenses associated with maintaining a data store or renting a portion thereof. To create a VPC 130, a customer, such as a user of a client device 106, may access one or more user interfaces served up by the VPC console service 121, which may assist the user in provided various settings of the VPC 130 that are stored in a configuration file and used to launch a new VPC 130 or modify an existing VPC 130.

The data stored in the data store 116 includes, for example, configuration files 131, service package files 132, authentication data 133, service log data 134, and potentially other data. Configurations files 131 may include one or more desired configurations of the satellite VPC 140 specified by a customer account via the VPC console service 121, and/or default configuration settings. For instance, the configuration file 131 may include internet protocol address ranges, subnet ranges and associated settings, configured route tables and network gateways, IP classless inter-domain routing (CIDR) block information, VPC name information, public subnet information, availability zone preferences and information, subnet name, DNS hostname information, hardware tenancy, as well as other specified configurations.

Service package files 132 may include package files that are installed or otherwise used in deploying a service, for example, through execution of an instance, a virtual machine, or other virtual process in a VPC 130. It is understood that service package files 132 may correspond to stable and non-stable service builds. Generally, stable versions of the core services 136 hosted in the primary VPC 135 are desirable for utilization.

Authentication data 133 includes data used to authenticate a customer account, an administrator account, and so forth, as well as associated permissions. In some embodiments, authentication data 133 of a customer account may indicate where the customer account has suitable permissions to perform isolated development in the satellite VPC 140 without impacting any service hosted by the primary VPC 135 or services of other satellite VPCs 140, as may be appreciated. Service log data 134 may include logs of events, metrics, or other information pertaining to the services deployed in the VPCs 130.

The client device 106 is representative of a plurality of client devices that may be coupled to the network. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 172. The display 172 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute an operating system 175 and various applications, such as a client application 178 and/or other applications. A client application 178 may be executed in a client device 106, for example, to access network content served up by the computing environment 103 and/or other servers, thereby rendering a graphical user interface on the display 172. To this end, the client application 178 may comprise, for example, a browser, a dedicated application, etc., and the user interface may comprise a network page, an application screen, etc. The client device 106 may be configured to execute applications beyond the client application 178 such as, for example, email applications, social networking applications, word processors, spreadsheets, and/or other applications.

Next, a general description of the operation of the various components of the networked environment 100 is provided. To begin, it is understood that VPCs 130 are, in essence, virtual networks that may be executed by a network service provider and configured by a customer or other end user. VPCs 130 are attractive to end users as they emulate the functionality of a data center while being logically isolated from other VPCs belonging to other organizations or entities. A VPC 130 thus acts as a secure container and/or secure network a customer may establish on their own using network services 115 offered by a network service provider, such that the customer can build, test, and run systems and services inside a VPC 130. Assuming a VPC 130 is correctly configured, the VPC 130 may be peered with other VPCs 130 to allow communication among the VPCs 130.

It is understood that customers of the network service provider have parts of a data center that they may wish to remove and reattach, for instance, to perform maintenance or upgrade. Additionally, network service providers wish to assist customers in building complex infrastructure. When a customer restarts a VPC 130, for example, it may take a long time for the VPC 130 to recover or, in other words, for its services to become operational. Additionally, if core services included in a VPC 130 are recycled, other peered VPCs 130 may be impacted. Customers however want to restart things on their own cadence.

According to various embodiments, an arrangement of VPCs 130 is described that includes a primary VPC 135 that hosts core services 136, and satellite VPCs 140a . . . 140n (collectively "satellite VPCs 140") that utilize resources of the primary VPC 135, such as the core services 136. In other words, the primary VPC 135 hosts core services 136 such that a persistent infrastructure is constantly provided to satellite VPCs 140, allowing customers to recycle infrastructure without impacting the core services 136 of the primary VPC 135. In some embodiments, a satellite VPC 140 is a customer-owned VPC 130 built using predefined infrastructure that is peered with a primary VPC 135 such that the satellite VPC 140 can access core services 136 of the primary VPC 135.

Further, in some embodiments, an administrator account, such as an administrator of a network service provider, may create a satellite VPC 140 on behalf of a customer account as needed using the VPC handling service 118, for example. Once the satellite VPC 140 is created, host management, life cycle, and other functions may be managed by the customer account. As shown in FIG. 1, the satellite VPC 140 may establish peered connections 143a . . . 143n (collectively "peered connections 143") with the primary VPC 135 such that the satellite VPCs 140 are able to access one or more resources from the primary VPC 135. This allows customers to host a partial set of services, referred to herein as satellite services 146a . . . 146n (collectively "satellite services 146") in the satellite VPC 140 while using core services 136 (or other services) from the primary VPC 135.

The services may be executed in a host, which may be accessible by a network endpoint, for example.

With the availability of satellite VPCs 140, the VPC handling service 118 hosts one or more stable test regions. In other words, customers are able to test and iterate on satellite services 146 without impacting other services, such as services of the primary VPC 135 as well as services of other satellite VPCs 140. Additionally, this allows running multiple versions of a same service in a same region, such as a live version of a simple storage service and a stub (test or temporary) version of a simple storage service together in the same region. Customers are also free to choose recycle cadence of their services in their satellite VPC 140 independent of a recycle rate of the primary VPC 135, allowing customers to test and automate their service setups.

It is understood that not all service builds by customers are automated. As such, in various embodiments, stable versions of the core services 136 hosted in the primary VPC 135 are provided. In other words, any non-automated service may be hosted in the primary VPC 135 and will be kept stable. Service owners and customers may automate the same in a satellite VPC 140 without impacting other services. This will also allow service teams to maintain a production and a test version of a service in a same region, for example.

Based on the foregoing, an administrator may utilize an administrator client device 106, for example, to generate and send a request 160 to the network service 115 that causes a satellite VPC 140 to be created. The satellite VPC 140 may be automatically configured to automatically establish the peered connection 143 and/or access the core services 136 of the primary VPC 136 in some embodiments. When a satellite VPC 140 is crated, a response 180 may be returned to the client device 106 that may include information regarding the newly-created satellite VPC 140 or information regarding accessing or interacting with the satellite VPC 140.

Figure 2:
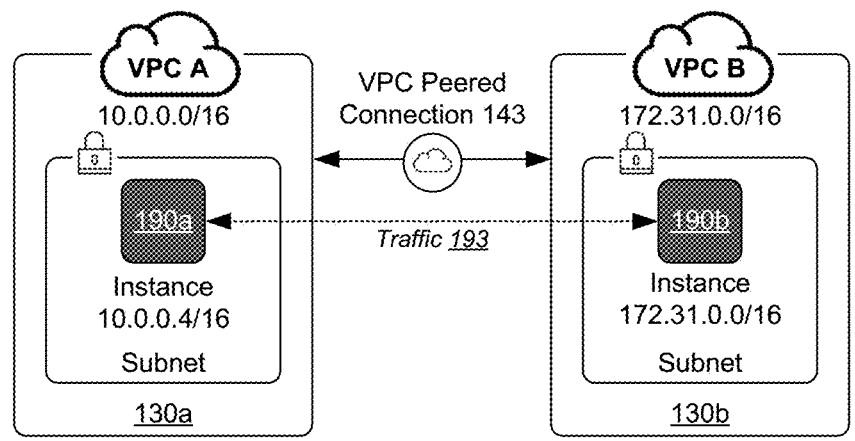
FIG. 2 is a schematic diagram showing a first virtual private cloud having a peered connection with a second virtual private cloud according to various embodiments of the present disclosure.

Referring next to FIG. 2, a schematic diagram is shown having a first VPC 130a having a peered connection 143 with a second VPC 130b according to various embodiments of the present disclosure. The peered connection 143 includes a networking connection between two VPCs 130 that enables traffic to be routed between the first VPC 130a and the second VPC 130b, for instance, using private IPv4 addresses or IPv6 addresses. Computing instances 190a, 190b (collectively "instances 190") in the first VPC 130a and the second VPC 130b, respectively, can transmit network traffic 193 to one another as if they are within the same logical network. The instances 190 may be created using, for example, the elastic computing service 124b. The VPCs 130 can be in a same region or in different regions according to various embodiments.

Figure 3:
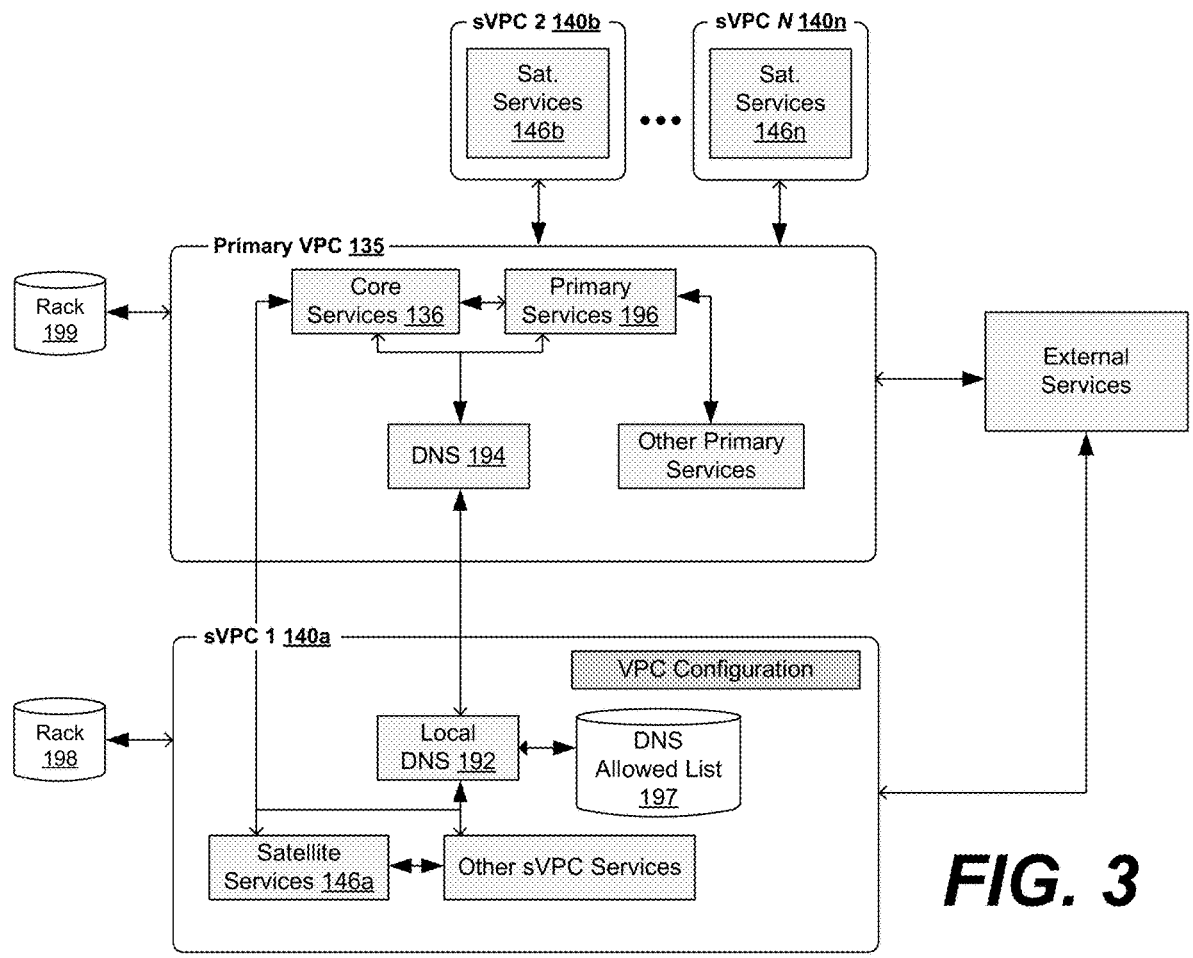
FIG. 3 is an example VPC architecture showing a primary VPC having a peered connection with one or more satellite VPCs according to various embodiments of the present disclosure.

Turning now to FIG. 3, an example architectural arrangement of the VPCs 130 of the networked environment 100 is shown according to various embodiments of the present disclosure. Notably, FIG. 3 includes a primary VPC 135 and a multitude of satellite VPCs 140. The primary VPC 135 includes core services 136 that are beneficial to satellite VPCs 140 and may include services required or essential for the satellite services 146 to function or otherwise operate as intended. As such, the core services 136 may include, for example, one or more of a credential management service, an authentication service, and a domain name service (DNS) management service. It is understood that, in some embodiments, other primary services 196 may execute in the primary VPC 135 that are not core services 136 of the satellite services 146.

One or more of the satellite VPCs 140 may be spun up by the VPC handling service 118, for instance, for developers associated with a customer account to build, test, and automate new region and data center launches. In some embodiments, a primary VPC 135 and a satellite VPC 140 are hosted in the same region. In some embodiments, for instance, when the satellite VPC 140 is spun up for development, the region may include a virtualized region or, in other words, an emulated region. As such, a satellite VPC 140 in an emulated region may only be connected to a primary VPC 135 in the same emulated region in some embodiments.

While various embodiments described herein may include the primary VPC 135 being managed or overseen by an administrator account associated with a network service provider administrator, in alternative embodiments, a customer account may be associated with the primary VPC 135 such that a customer is able to manage and make changes to the primary VPC 135. To this end, if a development team were to choose building one or more services in both the primary VPC 135 and the satellite VPC 140, the customer account will manage a separation of the resources used.

Using a web service as an example of a service to be deployed in the architecture of FIG. 1, FooService/KAT/Prod (a production service) may be deployed in the primary VPC 135 while whereas FooService/KAT/S1/Prod may be deployed in an instance of a first satellite service 146a. If a service is to be deployed in one place or will run the same version of code, no segregation of services may be required.

In some instances, the satellite VPCs 140 and the primary VPC 135 will not support two-way service discovery. As such, a service hosted in a satellite VPC 140 may be permitted to discover and communicate with another service hosted in the primary VPC 135 or the same satellite VPC 140. A service hosted in a first satellite VPC 140a, however, is not permitted to communicate with a service hosted in another satellite VPC 140b, 140n, and vice versa. A service hosted in the primary VPC 135 cannot discover a service hosted in a satellite VPC 140. It is understood, however, that in some embodiments, the foregoing restrictions may be removed.

Further, in some embodiments, any service may be discovered by a DNS record. By default, the services of the primary VPC 135 may not be discoverable. A tool can be used to explicitly ad a DNS from the primary VPC 135 in a DNS allowed list 197 of a satellite VPC 140. To this end, the peered connection 143 between a primary VPC 135 and a satellite VPC 140 may include a virtualized LAN or WAN established between the primary VPC 135 and the satellite VPC 140 by adding the satellite VPC 140 to a DNS allowed list 197 that permits traffic between the satellite VPC 140 and the primary VPC 135.

Further, basic infrastructure endpoints may be configured by default. In some situations, such as when a service is read non-automated, the network service provider may permit development teams to have a rack 198 attached to the satellite VPC 140, where the rack 198 includes physical hardware. As such, for services requiring specific hardware criteria, the rack 198 may be attached and/or customized for a satellite VPC 140. Similarly, the primary VPC 135 may have a rack 199, which also includes underlying physical hardware used to deploy the primary VPC 135. In some embodiments, the rack 198 of the satellite VPC 140 and the rack 199 of the primary VPC 135 are a same rack (e.g., both execute on and/or using the same underlying hardware).

To this end, satellite VPCs 140 can be attached to physical data centers such that the satellite VPC 140 executed thereon. Typically, services are instances of hosts running in data centers and the VPCs 130 occupy space of the data centers. One or more racks may be attached to that VPC 130 such that customizable or additional racks can be used for launching enterprise software. As such, special types of racks can be attached to the VPCs 130. Various configurations may be employed to this end. For instance, VPCs 130 may be deployed in different regions, on different underlying hardware, etc. An administrator of a satellite VPC 140 may dictate where the satellite VPC 140 is to be hosted. Accordingly, in some embodiments, a physical rack may be associated with an existing VPC 130 (e.g., a primary VPC 135) and the satellite VPC 140 may be launched in the same physical rack, or any other desirable rack.

In some embodiments, a separate subnet (e.g., 172.1 may be deployed across the satellite VPCs 140. A predefined range of the subnet may be divided between various satellite VPCs 140, for example. In situations where elastic IP (EIP) addresses are desired or required, a range of EIPs may be assigned to the satellite VPCs 140. In some embodiments, the satellite VPCs 140 are not connected to real regions and are used only as production and testing environments.

In some embodiments, the first satellite VPC 140a, the second satellite VPC 140b, and/or the third satellite VPC 140n are provided that are logically independent of the primary VPC 135 and/or each other. A first peered connection 143a may be formed between the primary VPC 135 and the first satellite VPC 140a, a second peered connection 143b may be established between the primary VPC 135 and the second satellite VPC 140b, and so forth. The core services 136 hosted in the primary VPC 135 may be invoked by the satellite VPCs 140. It is understood that the primary VPC 135 and/or a first subset of the satellite VPCs 140 (e.g., the first satellite VPC 140a) may be able to communicate with external services, whereas a second subset of the satellite VPCs 140 (e.g., the second satellite VPC 140b, the third satellite VPC 140n, and so forth) may not be able to communicate with external services.

It is understood that, in some embodiments, default settings of a local DNS 192 in a satellite VPC 140 may be changed or otherwise configured by a development team or other administrator of the satellite VPC 140. For instance, assume the primary VPC 135 hosts a production version of a website or other service. When an end user of the primary VPC 135 (or outside any of the VPCs 130, for example) visits "www.example.com" (or other network endpoint), the DNS 194 of the primary VPC 135 may serve up a production version of the website for "example.com" by mapping a hostname (e.g., example.com) to a corresponding IP address (e.g., an IP address of a host in the primary VPC 135).

However, in instances in which a development version is deployed in a satellite VPC 140, when an end user within the satellite VPC 140 accesses "www.example.com," a test version of the website may be served up based on configurations to the local DNS 192 instead of the production version hosted in the primary VPC 135. For instance, the hostname for "example.com" in the local DNS 192 may be modified by an administrator to point to an IP address of a host in the satellite VPC 140 running the development version of the website. This may facilitate service testing, as may be appreciated.

Additionally, the local DNS 192 may include information regarding the core services 136 of the primary VPC 136 such that, when a device 140 in the satellite VPC 135 requests a core service 136 or one of the satellite services 146 requests a core service 136, the request is routed to the core services 136 of the primary VPC 135 (e.g., outside of the satellite VPC 140). Based on the foregoing, it is possible to have different versions of a same service executing in different VPCs 130 (e.g., production version of "example.com" executing in the primary VPC 135 and a test version of "example.com" executing in the satellite VPC 140). Additionally, a production version of a service may be duplicated and executed in the satellite VPC 140 without any or significant code changes; however, when one of a core service 136 is invoked, a service outside of the satellite VPC 140 is actually invoked instead of one of the satellite services 146. To restate, when a request is generated within the primary VPC 135 to access a predefined service, a production version of the predefined service may be served up and, when a request is generated in one of the satellite VPCs 140 to access the predefined service, a test version of the same predefined service may be served up.

Figure 4:
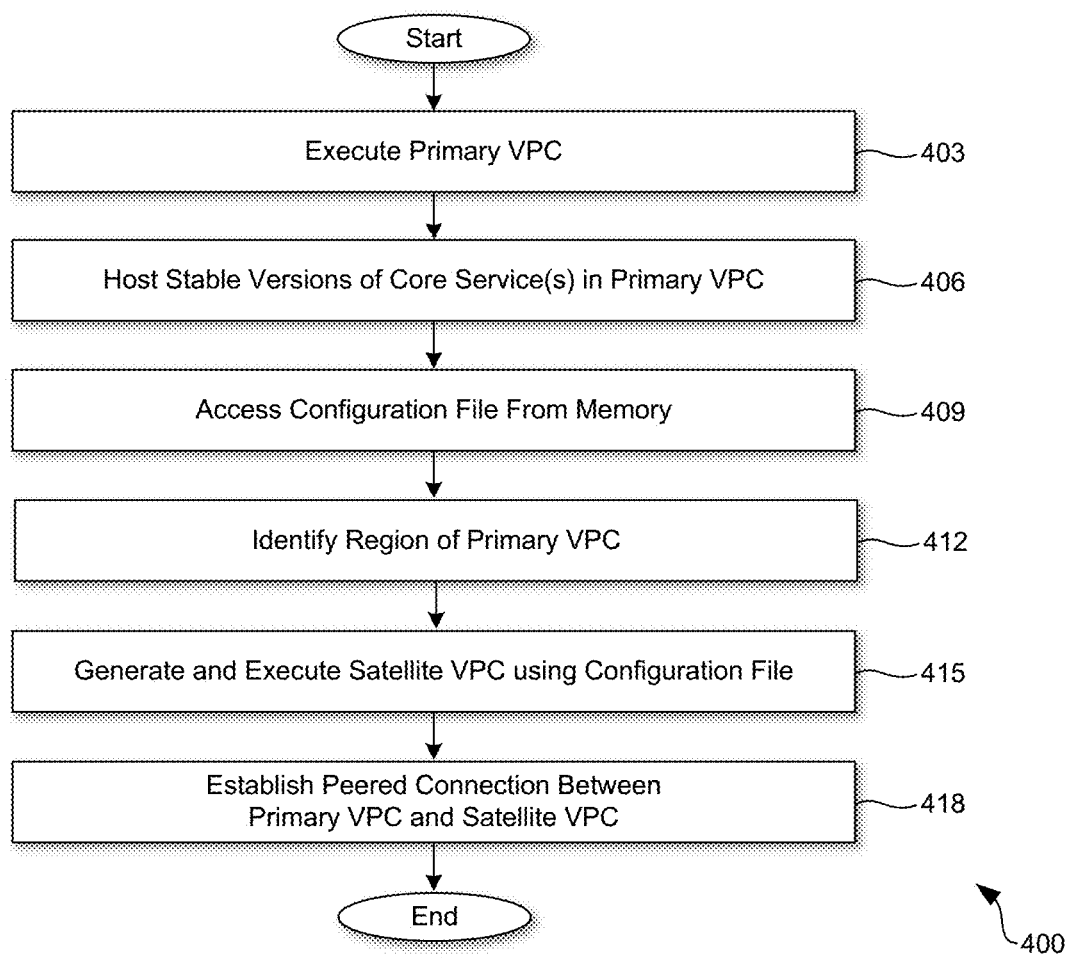
FIG. 4 is a flowchart illustrating one example of functionality implemented as portions of virtual private cloud handling service executed in a computing environment in the networked environment of FIG. 1 according to various embodiments of the present disclosure.

Moving on to FIG. 4, shown is a flowchart 400 that provides one example of the operation of a portion of the VPC handling service 118 according to various embodiments. It is understood that the flowchart of FIG. 4 provides merely an example of the many different types of functional arrangements that may be employed to implement the operation of the portion of the VPC handling service 118 as described herein. As an alternative, the flowchart of FIG. 4 may be viewed as depicting an example of elements of a method implemented in the computing environment 103 according to one or more embodiments.

Beginning with box 403, the computing environment 103 may execute or otherwise provide a primary VPC 135. In some embodiments, the primary VPC 135 includes a VPC 130 having only core services 136 hosted therein. In some embodiments, the computing environment 103 may associate an administrator account with the primary VPC 135. As such, in some embodiments, only the administrator account, such as an administrator of a network service provider, may make modification or manage services of the primary VPC 135. However, in alternative embodiments, a customer account may be associated with the primary VPC 135 such that the customer account may make modifications or otherwise oversee the primary VPC 135 and the services hosted and executed therein.

In box 406, the computing environment 103 may host stable versions of core services 136 in the primary VPC 135. This may include, for example, identifying a stable version of a core service 136 to be hosted from a multitude of available versions of the core service 136, and executing the stable version of the core service. In some embodiments, a most-recent stable version is selected for execution.

In box 409, the computing environment 103 may access a configuration file 131 from memory (e.g., the data store 116). The configuration file 131 may include one or more desired configurations of the satellite VPC 140 predefined by a customer account and/or default configuration settings. For instance, the configuration file 131 may include settings of the local DNS 192, specified internet protocol address ranges, subnet ranges and associated settings, configured route tables and network gateways, IP classless inter-domain routing (CIDR) block information, VPC name information, public subnet information, availability zone preferences and information, subnet name, DNS hostname information, hardware tenancy, and so forth.

In box 412, the computing environment 103 may identify a region in which the primary VPC 135 is executing (or is to be executed). In some embodiments, the region may include a physical region (e.g., a data center in a Pacific Northwest). In other embodiments, the region may include a region emulated by a VPC 130. This may include a region emulated in a classic partition, for example.

Next, in box 415, the computing environment 103 may generate and execute a satellite VPC 140 using, for example, configurations specified in the configuration file 131 accessed in box 406. In some embodiments, the satellite VPC 140 is executed in a same region as the primary VPC 135. Once the satellite VPC 140 is created, the host management and life cycle of the satellite VPC 140 may be managed by a customer and a network service provider may provide an application programming interface to perform host and life cycle management.

In some embodiments, generating a satellite VPC 140 may include associating a customer account with the satellite VPC 140 that permits isolated development of the satellite VPC 140. This may include, for example, associating a customer account with a suitable permission to perform isolated development in the satellite VPC 140 without impacting any service hosted by the primary VPC 135 or services of other satellite VPCs 140, as may be appreciated. As the satellite VPC 140 is to be peered with the primary VPC 135, the satellite VPC 140 may access resources from the primary VPC 135, thereby allowing customers to host a partial set of services in the satellite VPC 140 and use remaining services from the primary VPC 135.

In box 418, the computing environment 103 may establish a peered connection 143 between the primary VPC 135 and the satellite VPC 140. The peered connection 143 may include, for example, a networking connection between the primary VPC 135 and the satellite VPC 140 that enables the routing of network traffic between the VPCs using pre-defined network protocols, such as, but not limited to, private IPv4 addresses or IPv6 addresses. Accordingly, instances or services executing therein of either the primary VPC 135 or the satellite VPC 140 can communicate with each other as if they are within the same network (e.g., a virtualize local area network).

It is understood that while some examples relate to the primary VPC 135 and the satellite VPC 140 executing in a same region, the primary VPC 135 and the satellite VPC 140 may execute in different regions, where the peered connection 143 is referred to as an inter-region peered connection 143. This allows resources of the primary VPC 135 and/or the satellite VPC 140, including instances, databases and data stores, and on-demand code execution functions that run in different regions to communicate with each other using, for example, private IP addresses without requiring gateways, VPN connections, or other network appliances. To this end, in some embodiments, the traffic between the primary VPC 135 and the satellite VPC 140 may remain in the private internet protocol space. Additionally, inter-region traffic may be encrypted in some embodiments. Based on the foregoing, traffic between the primary VPC 135 and the satellite VPC 140 does not traverse a public network (e.g., the Internet), which reduces threats, such as common exploits and distributed-denial-of-service (DDoS) attacks.

It is understood that boxes 415-418 may be performed multiple times. For example, a customer may desire to have multiple satellite VPCs 140 generated and peered with the primary VPC 135. As such, a first satellite VPC 140a and a second satellite VPC 140b may be executed in a same region. For instance, the first satellite VPC 140a may be a testing and development environment, and the second satellite VPC 140b may be a production or live environment interfacing end users. Thereafter, the process may proceed to completion.

Figure 5:
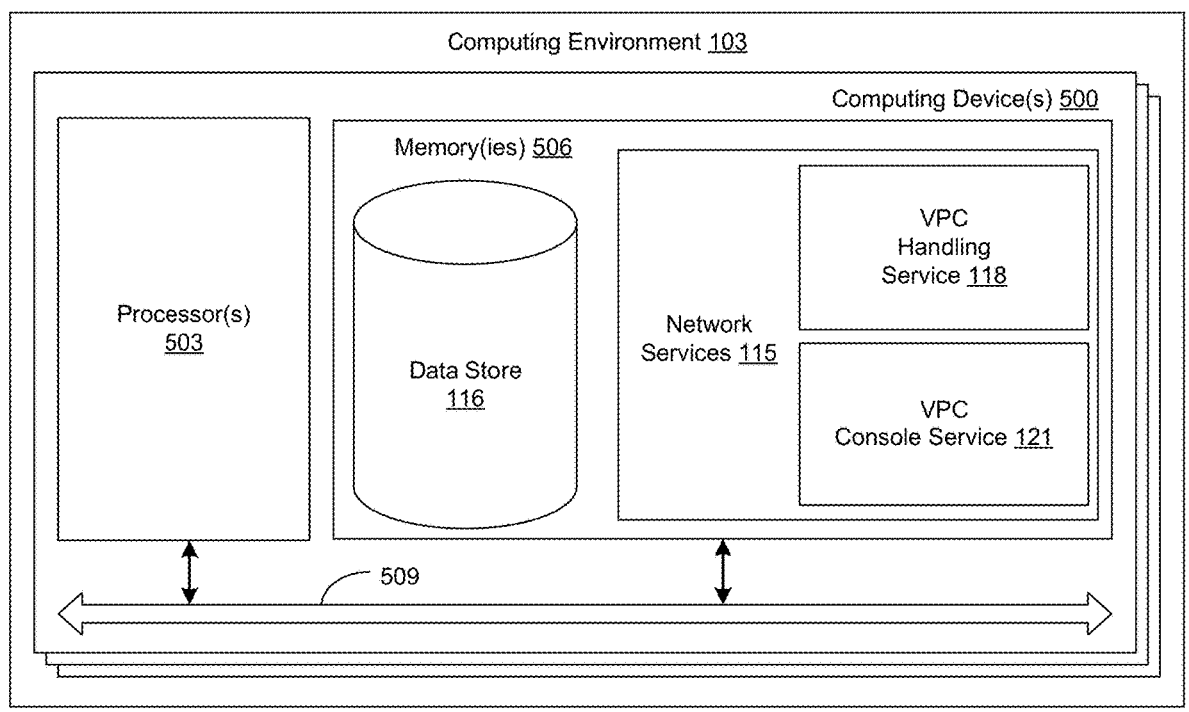
FIG. 5 is a schematic block diagram that provides one example illustration of a computing environment employed in the networked environment of FIG. 1 according to various embodiments of the present disclosure.

With reference to FIG. 5, a schematic block diagram of the computing environment 103 is shown according to an embodiment of the present disclosure. The computing environment 103 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the network services 115 including, but not limited to, the VPC handling service 118, the VPC console service 121, and potentially other applications. Also stored in the memory 506 may be a data store 116 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the VPC handling service 118, the VPC console service 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the VPC handling service 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the VPC handling service 118 and the VPC console service 121, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the VPC handling service 118 and the VPC console service 121, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device comprising at least one hardware processor; and memory comprising program instructions stored thereon that are executable in the at least one computing device that, when executed, direct the at least one computing device to:
- execute a primary virtual private cloud (VPC) networked environment managed by an administrator account of a network service provider, wherein the primary VPC networked environment is executed in an emulated data center region;
- in response to requests to spawn a test region being received from at least one customer account of the network service provider, generate and execute a plurality of satellite VPC networked environments in the emulated data center region that are logically independent of the primary VPC networked environment;
- establish a peered connection between the primary VPC networked environment and the satellite VPC networked environments such that the satellite VPC networked environments are able to access at least one resource of the primary VPC networked environment; and
- associate the at least one customer account with a suitable permission to perform isolated development on at least one of the satellite VPC networked environments without impacting a service of other ones of the satellite VPC networked environments.

2. The system of claim 1, wherein the at least one computing device is further directed to:
- in response to a request generated within the primary VPC networked environment to access a predefined service, serve up a production version of the predefined service; and
- in response to a request generated in one of the satellite VPC networked environments to access the predefined service, serve up a test version of the predefined service.

3. The system of claim 1, wherein the at least one computing device is further directed to assign a range of an internet protocol (IP) addresses in a predefined subnet to individual ones of the satellite VPC networked environments.

4. The system of claim 1, wherein the peered connection comprises at least one of a virtualized local area network (LAN) and a wide area network (WAN) established between the primary VPC networked environment and the satellite VPC networked environments by adding each of the satellite VPC networked environments to an allowed list that permits traffic between the satellite VPC networked environments and the primary VPC networked environment.

5. The system of claim 1, wherein the at least one computing device is further directed to:
- prior to the satellite VPC networked environment being executed, identify the emulated data center region in which the primary VPC networked environment is executing; and
- execute the satellite VPC networked environment in the emulated data center region such that the satellite VPC networked environment and the primary VPC networked environment execute in a same emulated data center region.

6. A system, comprising:
- at least one computing device comprising at least one hardware processor; and
- memory comprising program instructions stored thereon that are executable in the at least one computing device that, when executed, direct the at least one computing device to:
  - execute a primary virtual private cloud (VPC) networked environment having at least one core service hosted therein;
  - generate and execute a satellite VPC networked environment that is logically independent of the primary VPC networked environment having at least one satellite service hosted therein, the at least one core service being an older version of a same service and the at least one satellite service being a newer version of the same service, and the satellite VPC networked environment being configured to discover the at least one core service of the primary VPC networked environment by adding a domain name system (DNS) address associated with the at least one core service to an allowed list of the satellite VPC networked environment;
  - establish a peered connection between the primary VPC networked environment and the satellite VPC networked environment, wherein the peered connection permits the satellite VPC networked environment to access the at least one core service hosted in the primary VPC networked environment; and
  - associate at least one customer account with a suitable permission to perform isolated development in the satellite VPC networked environment without impacting any service hosted by the primary VPC networked environment.

7. The system of claim 6, wherein the peered connection comprises at least one of a virtualized local area network (LAN) and a wide area network (WAN) established between the primary VPC networked environment and the satellite VPC networked environment by adding the satellite VPC networked environment to an allowed list that permits traffic between the satellite VPC networked environment and the primary VPC networked environment.

8. The system of claim 6, wherein the primary VPC networked environment is executed in an emulated data center region.

9. The system of claim 8, wherein the at least one computing device is further directed to:
- prior to the satellite VPC networked environment being executed, identify the emulated data center region in which the primary VPC networked environment is executing; and
- execute the satellite VPC networked environment in the emulated data center region such that the satellite VPC networked environment and the primary VPC networked environment execute in a same emulated data center region.

10. The system of claim 6, wherein:
- the primary VPC networked environment comprises at least one primary service hosted therein that is different from the at least one core service;
- the satellite VPC networked environment comprises at least one satellite service hosted therein; and
- the at least one satellite service is permitted to discover and communicate with the at least one primary service or another satellite service hosted in the satellite VPC networked environment.

11. The system of claim 10, wherein:
- the satellite VPC networked environment is a first one of a plurality of satellite VPC networked environments;

the first one of the satellite VPC networked environments is prohibited from communicating with other ones of the satellite VPC networked environments; and the at least one primary service is prohibited from discovering the at least one satellite service hosted in individual ones of the satellite VPC networked environments.

12. The system of claim 6, wherein the at least one core service is at least one of: a credential management service, an authentication service, and a DNS management service.

13. The system of claim 6, wherein the satellite VPC networked environment is generated and executed using a predefined configuration file comprising at least one desired configuration parameter of the satellite VPC networked environment, the predefined configuration file being configurable by an administrator of the satellite VPC networked environment.

14. The system of claim 6, wherein the at least one computing device is further directed to:

prior to the primary VPC networked environment being executed, identify a first physical rack in which the primary VPC networked environment is to be executed; and prior to the satellite VPC networked environment being executed, identify a second physical rack in which the satellite VPC networked environment is to be executed, the first physical rack and the second physical rack comprising physical hardware of a data center.

15. A method, comprising:

providing, by at least one computing device comprising at least one hardware processor, a primary virtual private cloud (VPC) networked environment having at least one core service hosted therein;

providing, by the at least one computing device, a first satellite VPC networked environment that is logically independent of the primary VPC networked environment;

providing, by the at least one computing device, a second satellite VPC networked environment that is logically independent of the primary VPC networked environment;

establishing, by the at least one computing device and by adding the first satellite VPC networked environment to a first allowed list that permits traffic between the first satellite VPC networked environment and the primary VPC networked environment, a first peered connection comprising a first virtualized local area network (LAN) between the primary VPC networked environment and the first satellite VPC networked environment;

establishing, by the at least one computing device and by adding the second satellite VPC networked environment to a second allowed list that permits traffic between the second satellite VPC networked environment and the primary VPC networked environment, a second peered connection comprising a second virtualized LAN between the primary VPC networked environment and the second satellite VPC networked environment; and invoking, by the first and second VPC networked environments, the at least one core service hosted in the primary VPC networked environment.

16. The method of claim 15, further comprising associating, by the at least one computing device, at least one customer account with a suitable permission to perform isolated development in at least one of the first and second satellite VPC networked environments without impacting any service hosted by the primary VPC networked environment.

17. The method of claim 15, wherein the first satellite VPC networked environment and the second satellite VPC networked environment are executed in a same data center region.

18. The method of claim 17, wherein the first satellite VPC networked environment is a testing environment and the second satellite VPC networked environment is a production environment.

19. The method of claim 17, wherein providing the primary VPC networked environment comprises:

identifying, by the at least one computing device, a stable version of the at least one core service from a plurality of available versions of the at least one core service; and executing, by the at least one computing device, the stable version of the at least one core service.

20. The method of claim 15, further comprising recycling, by the at least one computing device, at least one service of the first satellite VPC networked environment independent of a recycling of any service of the primary VPC networked environment or the second satellite VPC networked environment.

* * * * *